United States Patent [19]

Kapp et al.

[11] Patent Number: 5,182,148
[45] Date of Patent: * Jan. 26, 1993

[54] COATINGS AND METHOD FOR COLORING LIGHT-TRANSMITTING CONTAINERS

[75] Inventors: David C. Kapp; Russell E. Boston; Leland H. Carlblom, all of Richland Township, Allegheny County; Mildred L. McKinley, Shaler Township, Allegheny County; Jess A. Kozma, Verona, all of Pa.

[73] Assignee: PPG Industries, Inc., Pittsburgh, Pa.

[ * ] Notice: The portion of the term of this patent subsequent to Feb. 4, 2009 has been disclaimed.

[21] Appl. No.: 810,061

[22] Filed: Dec. 19, 1991

Related U.S. Application Data

[63] Continuation-in-part of Ser. No. 557,448, Jun. 11, 1990, Pat. No. 5,085,903.

[51] Int. Cl.$^5$ .......................... B32B 27/06; B05D 5/06
[52] U.S. Cl. .................................... 428/34.6; 252/589; 427/164; 427/165; 427/393.5; 427/389.7; 427/162; 428/35.7; 428/417; 428/425.6; 428/426; 428/430; 428/441; 428/442; 428/480; 428/500; 428/524
[58] Field of Search ............... 427/168, 162, 389.7, 427/164, 389.7, 165, 393.5; 252/589; 428/34.6, 35.7, 417, 425.6, 430, 441, 442, 480, 500, 524, 426

[56] References Cited

U.S. PATENT DOCUMENTS

| | | | |
|---|---|---|---|
| 3,157,633 | 11/1964 | Kuhn | 564/270 |
| 3,350,204 | 10/1967 | Smith et al. | 430/255 |
| 3,519,462 | 7/1970 | Bristol et al. | 427/160 |
| 3,529,982 | 9/1970 | Luetni et al. | 427/160 |
| 3,859,117 | 1/1975 | Erchak et al. | 427/185 |
| 3,870,519 | 3/1975 | Piller | 427/160 |
| 3,937,853 | 2/1976 | Shank, Jr. | 427/29 |
| 4,000,148 | 12/1976 | Pond et al. | 427/160 |
| 4,053,076 | 10/1977 | Vogel et al. | 215/12.2 |
| 4,268,554 | 5/1981 | Gras | 428/34.7 |
| 4,319,016 | 3/1982 | Kurobe et al. | 427/160 |
| 4,320,174 | 3/1982 | Rabinovitch et al. | 428/518 |
| 4,389,421 | 6/1983 | Palamand | 426/330 |
| 4,409,266 | 10/1983 | Wieczorrek et al. | 427/302 |
| 4,557,730 | 12/1985 | Bennett et al. | 428/442 |
| 4,850,660 | 7/1989 | Jones et al. | 359/359 |
| 4,863,802 | 9/1989 | Moore et al. | 427/160 |
| 4,904,574 | 2/1990 | Suzuki . | |
| 4,904,578 | 2/1990 | Tanaka et al. . | |

*Primary Examiner*—Janice Bell
*Attorney, Agent, or Firm*—Dennis G. Millman

[57] ABSTRACT

Disclosed herein is a coating composition for coloring transparent containers such as glass bottles, the composition comprising a combination of a film-former such as an acrylic resin, a metal-free polymeric dye reactive with the resin, an adhesion promoter (and optionally an ultraviolet light absorber). Also disclosed are a method of coating containers with such a composition and the resulting product.

11 Claims, No Drawings

COATINGS AND METHOD FOR COLORING LIGHT-TRANSMITTING CONTAINERS

RELATED APPLICATION

This application is a continuation-in-part of U.S. patent application Ser. No. 07/557,448 filed Jun. 11, 1990, now U.S. Pat. No. 5,085,903.

BACKGROUND OF THE INVENTION

The present invention relates to coating compositions for coloring transparent objects, particularly glass objects, and more particularly container such as bottles, jars, and the like. Containers such as glass bottles made of glass of one base color, such as clear, or a small number of base colors may be provided with a wide variety of colors by applying a colored coating to the surface of the bottles. To change the color of the glass forming the body of the container can be costly due to lost production time during the color change. Heretofore, producing containers with a wide variety of colors was generally considered economically unfeasible, and production of a unique color could be justified only by a need for a large quantity. Providing color to containers by means of coatings avoids these constraints because the coating color can be changed much more readily than the color of the body of the containers.

The prior art includes many proposals to coat glass containers for the sake of improving strength and impact resistance was well as for coloration. However, the prior art container coatings have been found to have shortcomings in providing a combination of adhesion, clarity, and color fastness sufficient to withstand subsequent processing to which the containers may be subjected, such as washing, sterilizing, and contact with products during filling operations. Therefore, the present invention relates to improved compositions for providing such surface coloration that is resistant to subsequent process conditions.

Another requirement addressed by the present invention is that colorants in container coatings not contain metallic species that would complicate recycling of the containers. Environmental concerns also make it desirable that coating compositions of this type be water based.

The primary objective of the invention is to provide color to transparent containers for the sake of esthetics, and thus relates to alteration of transmittance of light in the visible wavelength range of about 360 to about 760 nanometers. Optionally, the present invention may provide coatings that also alter transmittance in the ultraviolet region of the spectrum (below 360 nanometers). It has been known that beverages such as beer, ale and the like made from or containing fermented extracts of malt are not stable to light. It is believed that harmful light, particularly in the ultraviolet region, adversely affects the flavor of these beverages in transparent light-transmitting containers and thereby causes a defect known as "lightstruck" flavor. The common art-known method of preventing lightstruck flavor of these beverages entails making the containers brown or dark amber in color. These colored containers are believed to cut out most of the harmful light. Alternatively, the containers can be treated with a delustering agent in order to reflect and diffuse the harmful light at the surface and thus prevent its passage into the containers.

Examples of prior art bottle coatings in general may be seen in U.S. Pat. Nos. 3,859,117; 3,937,853; 4,053,076; and 4,268,554.

Japanese Kokai 57-165466 (1982) and Japanese Kokai 61-209927 (1986) both disclose bottle coatings that include U.V. absorbers and may include dyes. There is no disclosure of selecting dyes that yield improved color fastness as in the present invention.

U.S. Pat. No. 3,519,462; 3,529,982; 3,870,519; 4,000,148; 4,319,016; 4,320,174; and 4,863,802 relate to U.V absorbers in resins and paints.

U.S. Pat. No. 4,557,730 discloses U.V. stabilization of dyes for fabrics.

U.S. Pat. No. 4,904,574 involves dyes that include metal complexes. The present invention specifically precludes metal-containing dyes because of the difficulties that metallic compounds cause in the recycling process.

The inclusion in coating compositions of additives to improve adhesion is generally known as shown in U.S. Pat. No. 4,409,266.

SUMMARY OF THE INVENTION

In accordance with the foregoing, the present invention encompasses a water-based, thermosetting coating composition comprising a combination of a film former, a reactive metal-free colorant, and an adhesion promoter. Optionally, the composition may additionally include an ultraviolet (UV) light absorber. The coating, when applied to a container, particularly a glass container, forms a transparent, colored, thermoset coating which has resistance to subsequent process conditions. By the term "water-based" herein is meant that water is the major diluent in the liquid coating composition. By the term "thermosetting" herein is meant that the coating composition undergoes an irreversible chemical transformation to form a film, particularly upon application of heat. By the term "reactive" with reference to the colorant is meant that the colorant is reactive with the monomers or oligomers of the film former, whereby under normal service conditions encountered by a coated article of this invention, the colorant is integrally bonded with the cured film. By the term "substantially blocks" is meant that there is less than 3 percent of transmitted light. The term "product damaging light" or "harmful light" refers to light with the wavelengths of electromagnetic radiation in the visible and ultraviolet regions which can cause undesirable flavor and/or odor changes in the contents of transparent containers. "Color" or "coloration" is intended to refer to absorption of light in the visible portion of the spectrum in the 360 to 760 nanometer range.

In the preferred embodiment, the invention comprises a water-based thermosetting coating composition comprising a film-former which is a hydroxy-functional acrylic resin in combination with a crosslinkable melamine resin, a reactive metal-free colorant which is a macromolecular chromophore-modified polymeric dye, and an adhesion promoter, for example gamma-glycidoxypropyltrimethoxysilane. The coating composition of this invention can produce hard, glossy, pasteurizable coatings with excellent adhesion.

DETAILED DESCRIPTION OF THE INVENTION

As a film-former, there can be employed herein a thermosettable material selected from the group consisting of an acrylic polymer, a polyester, a polyether, an epoxy polymer, a polyurethane or a mixture thereof. Typically, the thermosettable material contains a crosslinking group such as an active hydrogen, e.g., a hydroxyl group. In accordance with this invention, the thermosettable material is conductive to the formation of a transparent water-based coating. By the term "transparent" is meant that the coating is free of noticeable haze upon visual examination and that the human eye can perceive objects through the coated substrate. It should be understood that a container may be considered transparent even a very low levels of visible light transmittance (e.g., 10 percent or less).

An illustrative example of the thermosettable material can be an acrylic polymer which is compatible with water and which can be prepared by free radical addition polymerization of ethylenically unsaturated monomers at least one of which contains a hydroxyl group. A specific but non-limiting example of the monomer containing a hydroxyl group can be hydroxyethyl acrylate or hydroxyethyl methacrylate. Other monomers useful herein can be methylmethacrylate, styrene, butyl acrylate, butyl methacrylate, N-ethoxymethyl acrylamide or N-butoxymethyl acrylamide and the like. The polymer can be made compatible with water by incorporating therein a hydrophilic group such as an acid group that can be neutralized with a base such as amine or ammonia. The acid group can be introduced into the polymer by copolymerizing therein an acid group containing a monomer such as acrylic acid or methacrylic acid.

An external or internal crosslinking agent is usually employed herein. An illustrative example of the crosslinking agent can be a substituted and unsubstituted melamine, benzoguanamine, urea, isocyanate or amides. A specific but non-limiting example of the crosslinking agents can be hexamethoxymethyl melamines, partially methylated melamine formaldehyde resin, methylated ureas. Also, N-ethoxymethacrylamide or N-butoxymethacrylamide or the like can be copolymerized in the afore-described acrylic polymer in order to introduce an internal crosslinking agent into the polymer. The crosslinking agent is employed in an amount sufficient to provide an effectively cured coating. By "effectively cured coating" is meant that the coating is hard (greater than "H" pencil hardness), has good tape adhesion and does not blush or haze upon exposure to water. Typically, the crosslinking agent is employed in an amount of about 5 to 50 percent and preferably about 10 to 35 percent based on resin solids.

As a colorant, there can be employed herein a reactive, metal-free polymer which can be an active hydrogen-containing material such as a hydroxy-functional polymer which can be represented by the formula:

$$R[(CH_2CH_3O)_nH]_x$$

wherein R is a dyestuff radical, n is at least 15, x is from 1 to 6, and the product of n times x is at least 30, preferably between 50 and 200, more preferably between about  and 150.

Preferred among the compounds of the above formula are those wherein R is attached by an amino nitrogen. Compounds contemplated within this general class are those wherein R is a nitroso, nitro, azo, including monoazo, diazo and triazo, diphenylmethane, triarylmethane, xanthene, anthraquinone dyestuff radical. Especially preferred are compounds represented by the formula:

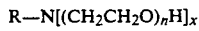

wherein R—N is an organic dyestuff radical, x is from 1 to 2, and the product of n times x is between 30 and 200, preferably between 50 and 150. Included within this latter class are those wherein R is an azo or anthraquinone dyestuff radical.

The most readily prepared and widest class of colorants of this invention are those having, in addition to a polyethyleneoxy group, an azo dyestuff group, anthraquinone dyestuff group, and the like. Specific examples of the colorant can be found in U.S. Pat. No. 3,157,633, which is incorporated herein by reference. The colorant can be present in an amount of about 0.2 to 50 percent and preferably about 0.5 to 20 percent by weight based on resin solids.

As an ultraviolet light absorber, there can be employed herein the following illustrative but non-limiting examples. The ultraviolet light absorber can be substituted benzophenones such as 2-hydroxybenzophenone, 2-(2-N-benzotriazol-2-yl)phenol; or 2,4',4,4'-tetrahydroxybenzophenone which is preferred. The ultraviolet light absorber is typically present in an amount of about 0 to 5.0 percent and preferably about 1.5 to 4 percent by weight based on resin solids.

In the preparation of the coating composition, the afore-stated ingredients can be blended thoroughly in any order. Additional ingredients, typical among which is an adhesion promoter such as a silane coupling agent, e.g., gamma-methacryloxy-trimethoxysilane or gamma-glycoxypropyltrimethoxysilane, can be employed. The resultant coating composition can have viscosity of about 30 to 120 seconds, preferably about 50 to 90 seconds, as measured with a No. 2 Zahn cup, at 20 to 40 percent solids. Volatile organic content (VOC) of the coating can be about 0.5 to 5.0 pounds per gallon, preferably about 2.1 to 3.5 pounds per gallon.

In the practice of the invention, the coating composition can be employed in a process for modifying the visible light-transmitting properties of containers made of clear or slightly tinted material, said process comprising coating the container with a thermosetting water-based coating composition comprising an effective combination of a film-former, a non-metallic, reactive colorant, and an adhesion promoter in an amount sufficient to form a transparent thermoset coating. The applied coating is usually cured by application of high temperature air to bring the temperature of the container substrate, such as glass, above 300° F. The resultant coating in specific examples may typically have a film weight of about 0.1 to 0.9 milligrams per container, and preferably about 0.2 to 0.7 milligrams per container, using a 12-ounce volume glass beverage bottle as a standard. Expressed differently, the coating composition is typically applied at a film thickness of about 0.05 to 0.3 mils or higher.

The light-transmitting container can be made of glass, plastic or the like, including pretreated containers. In addition to beverage containers, the coatings of the present invention may be used on containers for cosmetics, medicines, or food.

This and other aspects of the invention are further illustrated by the following non-limiting examples.

EXAMPLE A

The following is an example of an acrylic polymer that is useful as a film former in the preparation of the coating composition of this invention. The acrylic polymer was prepared by free radical initiated addition polymerization using the following:

| Ingredients | Parts by Weight |
| --- | --- |
| Butyl Cellosolve | 777.7 |
| Butanol | 359.5 |
| Styrene | 107.2 |
| Methyl Methacrylate | 643.7 |
| Acrylic Acid | 257.5 |
| Butyl Acrylate | 922.6 |
| Hydroxyethyl Acrylate | 107.2 |
| Butyl Methacrylate | 107.2 |
| N-butoxymethyl acrylamide (60 wt. % solids) | 174.3 |
| Tertiary Dodecyl Mercaptan | 10.7 |
| T-butyl Perbenzoate | 37.7 |
| Dimethylethanolamine | 303.3 |
| Deionized Water | 2450.0 |
| "Shellmax" Wax[1] | 42.9 |
| Carnauba Wax | 42.9 |

[1] Available from Shell Chemical Co.

The resultant acrylic polymer having 37 percent solids was employed in the coating compositions of this invention as follows.

EXAMPLE 1

A coating composition of the invention which was essentially opaque to ultraviolet light in the region of 375 to 300 nm on a colorless glass bottle while possessing very little or no visible color was prepared as follows:

| Composition Ingredients | Percent Compositions |
| --- | --- |
| Acrylic resin of Example A | 57.2 |
| "Cymel 385"[1] | 38.5 |
| "A-187" Silane[2] | 1.9 |
| "Uvinul D-50"[3] | 2.4 |

[1] A melamine resin available from American Cyanamid.
[2] Gamma glycidoxypropyltrimethoxysilane from Union Carbide Co.
[3] 2,2',4,4'-tetrahydroxybenzophenone from BASF Co.

The above ingredients were blended in the above-listed order, diluted with deionized water to 35 percent solids and a VOC of 2.8 and spray applied to a 12-ounce flint glass bottle. The applied coating was cured thermally to a peak glass temperature of 300° F. to give a clear, hard and glossy film that was resistant to immersion in 170° F. water without hazing, blushing or loss of adhesion as measured by a cross hatch/tape test. This adhesion test involves scribing the coating in a crosshatched pattern, applying Scotch ® No. 610 adhesive tape to the scribed area, and forcibly removing the tape. The coating fails the adhesion test if any of the coating is removed with the tape. A visible and UV transmittance spectrum measurement shown very little absorbence below 400 nm with complete opacity below 375 nm.

EXAMPLE 2

A coating composition of the invention which was essentially opaque to ultraviolet and visible light in the region of 525 to 300 nm on a colorless glass bottle thereby giving a lightstruck flavor protection equal to or greater than amber glass to light sensitive materials such as beer was prepared as follows.

| Ingredients | Percent Compositions |
| --- | --- |
| Acrylic resin of Example A | 50.2 |
| "Cymel 385" | 33.8 |
| "A-187" Silane | 1.7 |
| Uvinul D-50 | 2.1 |
| "Reactint Yellow X15"[1] | 2.5 |
| "Reactint Orange X38"[2] | 2.5 |
| "Reactint Blue X3LV"[3] | 1.7 |

[1] Polymeric metal-free colorant from Milliken Chemical.
[2] Polymeric metal-free colorant from Milliken Chemical.
[3] Polymeric metal-free colorant from Milliken Chemical.

The above ingredients were blended in the above-listed order, diluted with deionized water to 35 percent solids and a VOC of 2.8 pounds per gallon and spray applied to a 12-ounce colorless bottle. The applied coating was cured thermally to a peak glass temperature of 300° F. to give a hard, glossy film, dark brown in color and resistant to immersion in 170° F. water without hazing, blushing, loss of adhesion, or leaching of colorant into the water bath. A visible and UV transmittance spectrum measurement showed substantially complete absorbence from 525 to 300 nm.

EXAMPLE 3

This example further illustrates the preparation of an acrylic polymer that was employed in the preparation of a coating of this invention.

| Ingredients | Parts by Weight |
| --- | --- |
| Reactor Charge | |
| Butyl Cellosolve | 337.5 |
| Butanol | 125.0 |
| SHELLMAX wax | 25.0 |
| MEKON wax | 15.0 |
| Charge X | |
| Butyl Cellosolve | 37.5 |
| t-Butyl perbenzoate | 25.0 |
| Charge A | |
| N-butyoxymethyl methacrylamide (60 wt. % resin solids) | 325.2 |
| Acrylic acid | 120.0 |
| Butyl acrylate | 130.0 |
| Methyl methacrylate | 550.0 |
| Rinse | |
| Butanol | 10.0 |
| Charge B | |
| Butyl cellosolve | 2.5 |
| t-Butyl perbenzoate | 2.5 |
| Charge C | |
| Butyl cellosolve | 2.5 |
| t-Butyl perbenzoate | 2.5 |
| Charge D | |
| Dimethylethanolamine | 148.3 |
| Charge E | |
| Deionized water | 200.7 |

A reaction vessel equipped with thermometer, stirrer, dropping funnels, reflux condenser and means for maintaining a blanket of nitrogen was charged at room temperature with a composition consisting of the reactor charge. The composition was heated over a period of about 40 minutes to reflux. When reflux temperature was attained, the simultaneous, gradual addition to the vessel of Charge A and Charge X was started and continued over three hours while maintaining reflux. When the addition of Charges A and X were completed and at 129° C., Charge B and the Rinse were added and the reaction mixture was held for 1.5 hours. Charge C was added at 128° C. and the reaction mixture was held for 1.5 hours. The reaction mixture was then cooled to 123° C. (resin solids was 29.0 percent). Feed D was injected into the reaction mixture over 15 minutes and held for 15 minutes. Feed E was added to the reaction mixture over 1.5 hours at 113° C. The resultant mixture was heat aged for 2 hours over 72° C. to 44° C. Analysis: Milliequivalents of acid was 0.436; milliequivalents of base was 0.440, weight average molecular weight was 17,403, viscosity was 435 centipoises (Brookfield No. 3 spindle) at 20 RPM, pH was 8.08 and solid of 28.7 percent (measured at 110° C. for 2 hours).

EXAMPLE 4

A coating composition of the invention which was essentially opaque to ultraviolet and visible light in the region of 525 to 300 nm on a colorless glass bottle thereby giving a lightstruck flavor protection equal to or greater than amber glass to light-sensitive materials such as beer was prepared as follows:

| Ingredients | Percent Compositions | Resin Solids |
| --- | --- | --- |
| The above acrylic resin | 140.4 | 40 |
| "A-187" Silane | 0.8 | 0.8 |
| "Reactint Yellow X15" | 5.0 | 5.0 |
| "Reactint Orange X38" | 4.2 | 4.2 |
| "Reactint Blue X3LV" | 1.0 | 1.0 |
| "Uvinul D-50" | 10.0 | 2.0 |
| L-7500 Silicone Fluid[1] | 0.1 | 0.1 |

[1]Available from Union Carbide.

The above ingredients were blended in the above-listed order, diluted with deionized water to 26.7 percent solids and spray applied to a 12-ounce clear bottle. The applied coating was cured thermally to a peak glass temperature of 340° F. to give a hard, glossy film, dark brown in color and resistant to immersion in 180° F. water for 10 minutes without hazing, blushing, loss of adhesion, or leaching of colorant into the water. A visible and UV transmittance spectrum measurement showed substantially complete absorbence from 525 to 300 nm.

While the illustrative embodiments of the invention have been described hereinabove, it will be understood that various modifications will be apparent to and can be made by those skilled in the art without departing from the scope or spirit of the invention. Accordingly, it is intended that the claims directed to the invention construed as encompassing all aspects of the invention which would be treated as equivalents by those skilled in the art to which the invention pertains.

Therefore, what is claimed is:

1. A water-based, thermosetting, transparent colorant coating composition comprising: (i) a film-former including a resin and an internal or external crosslinking agent; (ii) a metal-free polymeric dye which is reactive with the film-former; and (iii) an adhesion promoter in an effective combination to form a transparent thermoset coating for coloring containers.

2. The water-based thermosetting coating composition of claim 1 wherein the film-former is selected from the group consisting of an acrylic polymer, a polyester, a polyether, an epoxy polymer, a polyurethane, an aminoplast, a phenoplast or a mixture thereof.

3. The water-based thermosetting coating composition of claim 1 wherein the colorant is a hydroxy-functional macromolecular chromophore-modified polymeric dye.

4. A water-based thermosetting coating composition of claim 1 wherein the colorant is present in an amount of about 0.2 to 50 percent by weight based on resin solids.

5. The coating composition of claim 1 wherein the reactive dye absorbs light in the range of 360 to 760 nanometers.

6. A process for coloring a light-transmitting container comprising coating the container with a thermosetting, water-based coating composition comprising a film-former including a resin and an internal or external crosslinking agent, a metal-free polymeric dye which is reactive with the film-former, and an adhesion promoter in an effective combination to form a coating which partially absorbs transmission of visible light.

7. An article of matter comprising a substrate to which has been applied the water-based thermosetting coating composition of claim 1.

8. The article of matter of claim 7 wherein the coating composition is applied at a film thickness of at least about 0.05 mils.

9. The article of matter of claim 7 wherein the coating composition is applied at a film thickness of no more than 0.3 mils.

10. An article of matter of claim 8 wherein the substrate is glass or plastic.

11. An article of matter of claim 9 which is in the form of a bottle.

* * * * *